Patented July 1, 1952

2,602,045

UNITED STATES PATENT OFFICE 2,602,045

AZEOTROPIC DISTILLATION PROCESS FOR PREPARING PURE, CRYSTALLINE PENICILLIN SALTS

Edward B. Hodge, Terre Haute, Ind., assignor to Commercial Solvents Corporation, Terre Haute, Ind., a corporation of Maryland No Drawing. Application August 3, 1946, Serial No. 688,343

2 Claims. (Cl. 202—42)

This invention relates to a process for preparing pure penicillin material, and more particularly to a method for preparing such pure penicillin material in the crystalline state in the form of its salts.

In copending application of Murray Senkus, Serial No. 575,555, filed January 31, 1945, now Patent No. 2,538,735 there is described a method for preparing pure ammonium penicillin from dry, impure concentrates thereof, and a method for converting the pure ammonium penicillin into other pure penicillin salts.

I have now found that pure, crystalline penicillin salts, such as ammonium penicillin, substituted ammonium penicillins, potassium penicillin, sodium penicillin, and rubidium penicillin, may be prepared directly from impure aqueous solutions thereof, without the necessity for first preparing a dry, impure concentrate, by adding to the aqueous solution a quantity of an organic solvent of a type to be described, distilling to remove substantially all the water, leaving a substantially saturated penicillin-salt solution in the organic solvent, and subsequently crystallizing the penicillin salt.

Among the substituted ammonium penicillins of my invention may be mentioned methylammonium penicillin, diethylammonium penicillin, trimethylammonium penicillin, choline penicillin, and benzyltrimethylammonium penicillin.

In the currently used methods for the recovery of penicillin from culture liquors in which it is produced, the liquor is variously treated to purify and concentrate it and eventually to obtain it in the form of a relatively concentrated but still impure water solution. The aqueous penicillin salt solution thus obtained is then frozen and dried from the frozen state, and this dry material is stored under refrigeration for subsequent administration upon re-solution in water.

One prior-art method for obtaining the aqueous solutions of penicillin described above involves the steps of filtering the culture liquor, adsorbing the penicillin on active carbon, eluting the penicillin with an aqueous-organic solvent mixture, evaporating the organic solvent, acidifying and extracting the aqueous penicillin-containing residue with a water-immiscible organic solvent such as amyl acetate, and then re-extracting the amyl acetate with an aqueous alkaline solution. Other methods involve extraction of the filtered culture liquors with an organic solvent, followed by multiple-step extractions, alternately into organic solvents and aqueous alkaline solutions.

In carrying out my invention, I first prepare an aqueous solution of penicillin salts according to the prior-art methods, for example, by re-extraction of the amyl acetate solution of penicillin described above with an aqueous solution of an alkaline compound of the desired cation, preferably the hydroxide, carbonate, or bicarbonate, and preferably using such quantity of the alkaline solution as will produce a final pH within the range of about 6 to 8. I may then concentrate it by known means, as by another series of solvent extractions, or preferably by low-temperature distillation under reduced pressure, to a concentration of at least about preferably around 50,000 Oxford units of penicillin activity per milliliter. However, such an intermediate concentrating step is not essential to my process.

To the aqueous solution I then add an organic solvent for penicillin salts having the property of forming an azeotrope with water, i. e., when heated to ebullition in the presence of water, of forming a vaporous mixture comprising a substantial proportion of water, whereby said solvent is capable of removing the water from the said penicillin solution by a distillation operation. The solvent is added in such proportion as will give a substantially saturated solution of the penicillin salt in the organic solvent at ordinary temperatures after removal of the water by azeotropic distillation. The mixture is then distilled to remove the water, preferably with fractionation through a suitable column, at reduced pressure, and at a liquid temperature below about 40° C. Higher temperatures may be employed, but in such case the length of time during which the solution is exposed to such temperatures should be held to a minimum, as by use of a so-called "flash" distillation, for example, in a falling-film evaporator, in order to minimize the decomposition of penicillin. Any organic solvent present in the distillate may be removed by decantation if the distillate is heterogeneous, or by fractional distillation in an auxiliary still, and may then be returned to the process. The distillation is continued until substantially all of the water has been removed from the still. The solution may then be further concentrated under similar conditions, if necessary until the concentration of penicillin salt in the residual solvent is at least as great as the concentration required to saturate the solvent at ordinary temperatures, or until crystallization begins, as evidenced by a clouding of the liquid.

Concentration of the solution is then discontinued and the mixture is allowed to stand, preferably at low temperatures, for example, around 5° C., until a large proportion of the pure penicillin salt has crystallized. The crystals may then be separated, as by filtration or the like, and may then be washed and dried. They are then ready for storage and use, or for conversion to other penicillin salts if desired. The mother liquor still contains considerable penicillin activity which may be recovered in a suitable manner, for example, by recycling to the aqueous evaporate stage for re-extraction with amyl acetate.

Alternatively, I may choose to prepare the crystalline penicillin salts by evaporating the organic solvent substantially completely under reduced pressure at low temperatures. In this modification of my invention, I prefer to measure the organic solution accurately into serum vials, and to evaporate the solution to dryness under a pressure of about 10-40 mm. Hg and at temperatures below about 40° C.

Solvents suitable for use in my process to effect water removal from, and subsequent crystallization of the penicillin salts include all of the organic alcohol solvents for penicillin salts described in the copending application referred to above which are capable of removing water from penicillin-salt solutions when added thereto and distilled.

Particularly adapted for my purpose is the group of organic alcohols that may be described as "hydrophilic," that is either miscible with water, or capable of dissolving at least about 3 to 5% of it. A number of classes having operative members are given in the following list: alcohols, glycols, hydroxy ethers and hydroxy esters. As specific examples of the foregoing classes of solvents may be cited ethanol, n-propyl alcohol, isopropyl alcohol, n-butyl alcohol, secondary butyl alcohol, tertiary butyl alcohol, n-hexyl alcohol, capryl alcohol, n-octyl alcohol, 2-ethylhexyl alcohol, diethylcarbinol, allyl alcohol, ethylene glycol, 2-methyl-2,4-pentanediol, propylene glycol, diacetone alcohol, cyclohexanol, butyl cellosolve.

I use the alcohol solvents because of the ease with which solution and crystallization can be effected from them. By the term "alcohol solvents" I wish to include those solvents which are strictly classified as alcohols, such as normal alcohols, secondary alcohols, tertiary alcohols, saturated and unsaturated alcohols, straight-chain and cyclic alcohols, and the like, and also those compounds which, though not always strictly classified as alcohols, contain alcohol or hydroxyl groups, such as hydroxy esters, hydroxy ethers, and the like. Therefore, wherever the term "alcohol" is used in the claims, it should be construed to include all of the alcohol-type compounds described above, as well as the compounds usually included in the term.

Of the various alcohol solvents, I utilize the class which forms water azeotropes, and particularly the lower aliphatic primary, secondary, and tertiary alcohols, because of their ready availability, and the high yields of crystals obtainable therefrom.

For the satisfactory application of my process to the preparation of pure, crystalline sodium penicillin, I find it desirable to start with a relatively pure sodium penicillin instead of the crude material which may be used in the preparation of other salts. The yield of crystalline sodium penicillin tends to be greatly reduced by the presence of any substantial quantities of organic impurities in the solution in which the crystallization is carried out, and the effect varies somewhat, depending on the nature of the impurities. Ordinarily, however, I am able to crystallize sodium penicillin successfully from an organic-solvent solution of impure sodium penicillin having a potency as low as 900 units per milligram of dissolved solid.

Prior to the crystallization step of my process, I have found it advantageous to treat the penicillin solutions at one or more of the various stages with a small proportion of an active charcoal, an active magnesium silicate, or other material of the type commonly referred to as decolorizing agents, thereby removing substantial proportions of impurities of unknown composition which tend to retard crystallization. This treatment may be carried out by slurrying the decolorizing agent with the penicillin solution and subsequently filtering and washing the filter cake with a small quantity of clean solvent.

The term "pure" as used herein to describe the crystalline penicillin salts of my invention is not used in its absolute sense to designate a material completely free from all impurities. Accordingly, wherever the term "pure" appears as relating to penicillin salts, it should be construed as designating a purity at least about 85% of the theoretical purity of the particular type of penicillin designated, measured in terms of Standard units of penicillin activity per milligram of solids, as assayed against the U. S. Food and Drug Administration standard, March 25, 1944, and based on crystalline sodium penicillin G, having an arbitrarily ascribed antibiotic activity of 1650 units per milligram of solids against the organism *Staphylococcus aureus*. The standard unit referred to is an arbitrary unit established by the U. S. Food and Drug Administration. (A. C. Hunter and Wm. R. Randall, "Standardization of Assay of Penicillin," J. Assoc. of Official Agricultural Chemists, August 1944, pp. 430-438.) While this unit is not precisely the Oxford unit, it is so close to it as to be well within the experimental error of the assays used; and for lack of a precise name, this unit is more or less universally referred to as synonymous with the Oxford unit.

The following examples will further illustrate my invention:

*Example I*

A 600-ml. portion of amyl acetate extraction from a plant penicillin recovery process, assaying about 5,000 Oxford units of penicillin activity per milliliter, was stirred for ten minutes with 5% by weight of "Darco G-60," the resulting slurry was filtered, and the char was washed with a small portion of fresh amyl acetate. To the combined filtrate and washings was then added with stirring a sufficient quantity of a ¾% aqueous solution of potassium hydroxide to bring the pH of the water layer to 7 and to convert the penicillin to the potassium salt. This aqueous layer was separated and concentrated at a pressure of about 32 mm. and at 30° C. to about $\frac{1}{10}$ its original volume. To the concentrated solution containing about 200,000 Oxford units per milliliter was added a volume of n-butyl alcohol equivalent to four times the volume of the concentrate. The mixture was then distilled at 32° C. and 32 mm. until substantially all the water had been removed as an azeotropic mixture with the n-butyl alcohol, and the distillation was continued to a liquid temperature of 50° C. to effect still further concentration of the solution. At this point crystals of potassium penicillin began to form. The mixture was removed from the distillation flask and allowed to stand in a refrigerator at about 0° C. for about 4 hours to crystallize. The mixture was then filtered, and the pure potassium penicillin crystals were washed with n-butyl alcohol and dried. The dry crystals weighed 0.923 gram, assayed 1725 Oxford units of penicillin activity per milligram, and contained a total of 1,592,000 units. The conversion amounted to 53%.

*Example II*

One hundred milliliters of an aqueous ammonium penicillin solution assaying 24,000 Oxford units of penicillin activity per milliliter was distilled under vacuum at a temperature of 30° C. to a volume of 8 ml. and a concentration of 300,000 units per milliliter. To this concentrate were added 40 ml. of n-butyl alcohol, and the solution was further distilled until all the water had been removed as the azeotrope, and until the volume had been reduced to 5 ml. At this point crystals began to form. The concentrated solution was removed from the distillation flask, cooled to about 10° C. and stirred until crystallization was complete. The crystals were then filtered, washed with n-butyl alcohol and then with acetone, and were subsequently dried in air. The product was 0.471 gram of pure crystalline ammonium penicillin assaying 1740 Oxford units per milligram and amounting to a conversion of 35%.

*Example III*

Two hundred and five milliliters of an aqueous ammonium penicillin solution assaying 21,000 Oxford units of penicillin activity per milliliter, were distilled under vacuum at a temperature of 30° C. to 10 ml., at which point the penicillin concentration was 430,500 units per milliliter. To this concentrate were added 80 ml. of secondary butyl alcohol, and the mixture was distilled at 30° C. under vacuum to a volume of 15 ml., whereupon crystals of pure ammonium penicillin formed. The crystals were filtered, washed with three 5-ml. portions of secondary butyl alcohol and then with two 15-ml. portions of acetone, and the crystals were dried in air. The product was 1.1403 gram of pure ammonium penicillin crystals assaying 1710 Oxford units per milligram (total 1,950,000 units).

*Example IV*

An amyl acetate solution of penicillin containing 20,000 Oxford units of penicillin per milliliter was extracted with 7.5% potassium hydroxide solution to a pH of 7.2. For this extraction, 3248 ml. of amyl acetate solution were used, and 295 ml. of aqueous extract assaying 197,000 Oxford units per milliliter were obtained. To this extract were added 885 ml. of n-butyl alcohol and the mixture was distilled at 20 mm. pressure until crystallization occurred. After the mixture had been left in the refrigerator overnight, the crystals were filtered, and the filtrate was again distilled at 20 mm. pressure to obtain an additional small amount of crystals. The combined crystals of potassium penicillin weighed 32 g. and assayed 1500 Oxford units per milligram. The conversion amounted to 74%.

*Example V*

Nine liters of an amyl acetate solution of penicillin assaying 273 Oxford units per milliliter were treated with 4% of "Darco G-60," as described in Example I, and the treated solution was extracted with aqueous 1% potassium hydroxide solution to pH 7.3, yielding 82 ml. of aqueous solution. The aqueous solution was adjusted to pH 6.5 by addition of 0.5 ml. of aqueous 10% phosphoric acid, and was then concentrated under reduced pressure and at temperatures below 40° C. to a volume of 33 ml. Subsequently, 93 ml. of n-butyl alcohol were added, and the concentration was continued until substantially all of the water had been removed, and until crystallization had started. There were obtained 0.8557 g. of crystalline potassium penicillin assaying 1543 units per milligram, corresponding to a yield of 56%.

*Example VI*

Three liters of an amyl acetate solution of penicillin assaying 829 Oxford units per milliliter were treated with sufficient aqueous 2.5% potassium hydroxide solution to raise the pH to 6.6, sufficient water was added to raise the volume of the aqueous phase to 50 ml., and the mixture was stirred for 30 minutes. The aqueous phase was then separated and concentrated at 10 mm. Hg and at temperatures below 40° C. to a volume of 16.5 ml. Subsequently, 50 ml. of n-butyl alcohol were added and the concentration was continued until substantially all the water had been removed, and until crystallization started. Crystalline potassium penicillin weighing 0.9525 g. and assaying 1497 units per milligram was separated, corresponding to a conversion of 61%.

*Example VII*

Three liters of an amyl acetate solution of penicillin assaying 825 Oxford units per milliliter were treated with sufficient aqueous 2.5% potassium hydroxide solution to raise the pH to 6.65, sufficient water was added to raise the volume of the aqueous phase to 50 ml., and the mixture was stirred for 30 minutes. The aqueous phase was then separated and concentrated at 10 mm. Hg and at temperatures below 40° C. to a volume of 18 ml. The concentrate was combined with 54 ml. of n-butyl alcohol and stirred for five minutes with 4 g. "Darco G-60." The resulting slurry was filtered, and the char was washed with a mixture of 18 ml. of n-butyl alcohol and 6 ml. of water. The combined filtrate and washings were subsequently concentrated at 10 mm. Hg and at temperatures below 40° C. until substantially all the water had been removed and until crystallization started. Crystalline potassium penicillin weighing 1.0488 g. and assaying 1556 units per milligram was separated, corresponding to a conversion of 68%.

*Example VIII*

A 2.5-liter portion of an amyl acetate solution of penicillin assaying 2670 units per milliliter was extracted to pH 7 with an aqueous 5% potassium hydroxide solution, plus 8 ml. of water, giving a total of 29 ml. of extract. To the extract were then added 40 milliliters of 2-methyl-2,4-pentanediol, and the combination was distilled at 10 mm. Hg and at temperatures below 45° C. until substantially all the water had been removed from the still. From the concentrate were separated 1.5845 grams of crystalline potassium penicillin assaying 1540 units per milligram, corresponding to a conversion of 37%.

*Example IX*

One hundred milliliters of an amyl acetate solution of penicillin assaying 43,000 units per milliliter were extracted with aqueous 1% rubidium carbonate solution to pH 6.9, and 54 ml. of aqueous extract were separated. The extract was then concentrated at low temperature and pressure to a volume of 30 ml. To the concentrate were subsequently added 90 ml. of n-butyl alcohol, and the mixture was dehydrated and concentrated to 30 ml. by further distillation at low temperature and pressure. The resulting concentrate was allowed to crystallize overnight in a refrigerator, and from it was separated 0.4353 g. of crystalline rubidium penicillin, assaying 1620 units per milligram, and corresponding to a conversion of 16.4%.

Example X

An amyl acetate solution of the acid form of penicillin, assaying 3600 units per milliliter, was treated with 16 grams of "Darco G-60" per liter. Of the treated amyl acetate solution, 965 ml. were then extracted with aqueous 5% sodium hydroxide solution to pH 7.5. The aqueous extract was separated, to it were added three volumes of n-butyl alcohol, and the mixture was dehydrated and concentrated at 20 mm. Hg to a maximum vapor temperature of 35° C., at which point substantially all of the water had been removed. The concentrate was stored overnight in a refrigerator, and after it had subsequently been allowed to warm to room temperature, crystals slowly separated. Pure, crystalline sodium penicillin weighing 0.891 gram and assaying 1635 units per milligram was obtained. The conversion, based on the penicillin in the purified amyl acetate, was 42%.

It should be noted that in the above specific examples the ratio by volume of alcoholic solvent to aqueous alkali metal penicillin solution varies from a low of about 1.4:1 in Example VIII to a high of about 8:1 in Example III. Volume ratios between these values are preferred in my process.

The quantity of alcoholic solvent added to the aqueous penicillin solution is, of course, substantially less than that required to cause precipitation of the penicillin but sufficient, upon azeotropic distillation of the mixture, substantially to eliminate the water and to leave a substantially saturated alcohol solution of the penicillin salt.

While the above describes the preferred embodiments of my invention, it will be understood that departures may be made therefrom within the scope of the specification and claims.

This is a continuation of my application Serial No. 619,253, filed September 28, 1945.

In accordance with the foregoing specification, I claim as my invention:

1. In the recovery of crystalline alkali metal penicillin salts from partially purified concentrated aqueous solutions thereof, the process which consists substantially in mixing such an aqueous solution with a lower aliphatic alcohol having from 2 to 8 carbon atoms and which forms an azeotrope with water, the quantity of alcohol added being substantially less than that required to cause precipitation of the penicillin but sufficient, upon azeotropic distillation of the mixture, substantially to eliminate the water and to leave a substantially saturated alcohol solution of the penicillin salts, azeotropically distilling off the water from the mixture under a reduced pressure and at a temperature not substantially exceeding 40° C., and recovering the resulting crystals of alkali metal penicillin from the resulting saturated solution thereof.

2. In the recovery of crystalline alkali metal penicillin salts from partially purified concentrated aqueous solutions thereof, the process which consists substantially in mixing one volume of such an aqueous solution with from about 1.4 to 8 volumes of a lower aliphatic alcohol, selected from a class consisting of normal butyl alcohol, secondary butyl alcohol and 2-methyl-2,4-pentanediol, the quantity of alcohol added being that required, upon azeotropic distillation of the mixture, substantially to eliminate the water and to leave a substantially saturated alcohol solution of the penicillin salts, azeotropically distilling off the water from the mixture under a reduced pressure and at a temperature not substantially exceeding 40° C., and recovering the resulting crystals of alkali metal penicillin from the resulting saturated solution thereof.

EDWARD B. HODGE.

REFERENCES CITED

The following references are of record in the file of this patent:

UNITED STATES PATENTS

| Number | Name | Date |
|---|---|---|
| 1,989,541 | Blanchod | Jan. 29, 1935 |
| 2,360,186 | Wyler | Oct. 10, 1944 |
| 2,461,949 | Wintersteiner et al. | Feb. 15, 1949 |
| 2,517,276 | Brassford et al. | Aug. 1, 1950 |

OTHER REFERENCES

Nature, October 7, 1944, page 459.

Pfizer Report, Summary of Purification and Chemical Studies on the Penicillins, up to Dec. 24, 1943, pages 1–5.

Othmer Industrial and Eng. Chemistry, Sept., 1941, pages 1106–1112.